(12) United States Patent
Owen et al.

(10) Patent No.: US 11,312,440 B2
(45) Date of Patent: Apr. 26, 2022

(54) REAR BRAKE ASSEMBLY OF KICK SCOOTER

(71) Applicants: Neil Owen, Guangdong (CN); FangYu Wu, Guangdong (CN)

(72) Inventors: Neil Owen, Guangdong (CN); FangYu Wu, Guangdong (CN)

(73) Assignee: Dongguan Hongmei Sports Equipment Co., Ltd., Dongguan (CN)

( * ) Notice: Subject to any disclaimer, the term of this patent is extended or adjusted under 35 U.S.C. 154(b) by 347 days.

(21) Appl. No.: 16/656,592

(22) Filed: Oct. 18, 2019

(65) Prior Publication Data

US 2020/0047843 A1 Feb. 13, 2020

(30) Foreign Application Priority Data

Feb. 27, 2019 (DE) .......................... 202019101123.8

(51) Int. Cl.
| | |
|---|---|
| *B62J 6/045* | (2020.01) |
| *B62K 3/00* | (2006.01) |
| *B62L 1/04* | (2006.01) |
| *B62J 6/16* | (2020.01) |

(52) U.S. Cl.
CPC .............. *B62J 6/045* (2020.02); *B62J 6/16* (2013.01); *B62K 3/002* (2013.01); *B62L 1/04* (2013.01)

(58) Field of Classification Search
CPC ........... B62L 1/04; B62K 3/002; B62K 11/00; B62K 11/02; B62K 11/14; B62K 19/30; B62K 23/00; B62K 27/12; B62K 2202/00; B62K 2204/00; B62J 6/045; B62J 6/16; B62J 6/057; B62J 6/028; B62J 6/02; B62J 45/20; B62H 3/08; B62H 3/04; B62H 5/00; B62H 2003/005; B62H 2700/005; B62M 6/45; B62M 6/90; B60Q 1/28; B60Q 1/30; B60Q 1/0483; B60Q 1/1415; B60Q 1/44; B60Q 1/2615; B60Q 2300/21; B60Q 2900/30; A63C 17/012; A63C 17/015; A63C 17/26; A63C 2203/12; A63C 2203/14; A63C 2203/22; A63C 2203/24
USPC .......................... 188/2 R; 280/87.041, 87.042
See application file for complete search history.

(56) References Cited

U.S. PATENT DOCUMENTS

| | | | | |
|---|---|---|---|---|
| 5,119,277 | A * | 6/1992 | Copley | .................. A63C 17/26 |
| | | | | 362/543 |
| 5,526,240 | A * | 6/1996 | Kuo | ........................... B62J 6/16 |
| | | | | 340/432 |
| 6,641,288 | B1 * | 11/2003 | Olsen | ..................... B60Q 1/305 |
| | | | | 362/477 |
| 9,878,230 | B1 * | 1/2018 | Seele | .................... A63C 17/012 |
| 2002/0117825 | A1 * | 8/2002 | Ho | ......................... B62K 3/002 |
| | | | | 280/87.041 |
| 2006/0175784 | A1 * | 8/2006 | Grossman | .............. A63C 17/26 |
| | | | | 280/87.041 |

* cited by examiner

*Primary Examiner* — Robert A. Siconolfi
*Assistant Examiner* — San M Aung

(57) ABSTRACT

A rear brake assembly of a kick scooter includes a brake including an attaching member having an open end; and a visual warning device being a module and fastened in the attaching member by snapping. Also, the fastening of the visual warning device in the attaching member is done manually.

5 Claims, 3 Drawing Sheets

REAR BRAKE ASSEMBLY OF KICK SCOOTER

BACKGROUND OF THE INVENTION

1. Field of the Invention

The invention relates to kick scooters and more particularly to a rear brake assembly of a kick scooter, the rear brake assembly having a releasable visual warning device.

2. Description of Related Art

Conventionally, a rear brake is pivotably secured to a deck of a kick scooter. The foot of a rider may press the brake to push against a rear wheel in order to stop a moving kick scooter. Further, some rear brakes of the kick scooter are equipped with a visual warning device. However, its installation is uneasy. Further, a replacement of a battery or other components of the visual warning device is uneasy if such need arises.

Thus, the need for improvement still exists.

SUMMARY OF THE INVENTION

It is therefore one object of the invention to provide a rear brake assembly of a kick scooter comprising a brake comprising an attaching member having an open end; and a visual warning device being a module and fastened in the attaching member by snapping.

The above and other objects, features and advantages of the invention will become apparent from the following detailed description taken with the accompanying drawings.

DETAILED DESCRIPTION OF THE INVENTION

Figure 1:
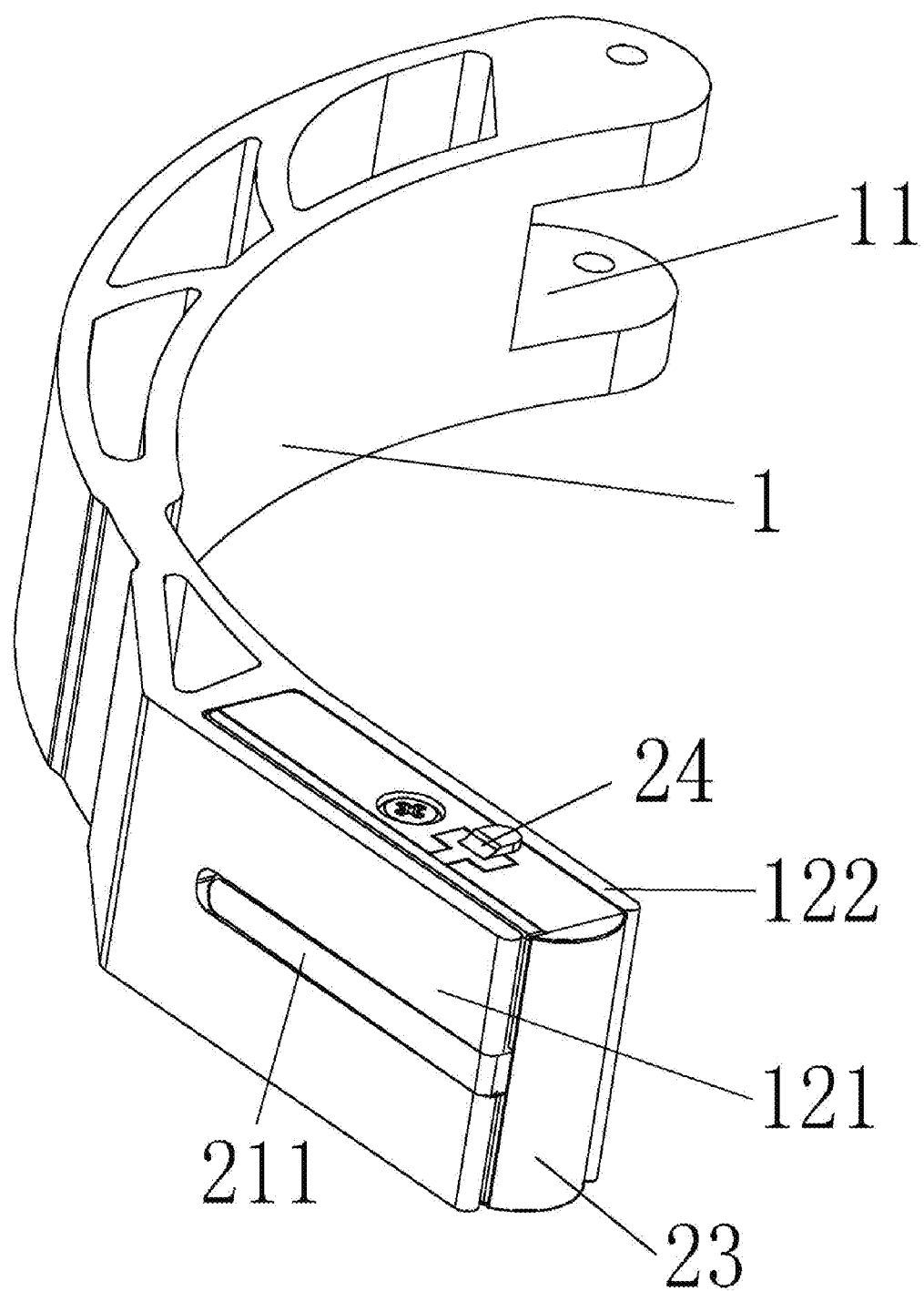
FIG. 1 is a perspective view of a rear brake assembly of a kick scooter according to the invention.
Figure 2:
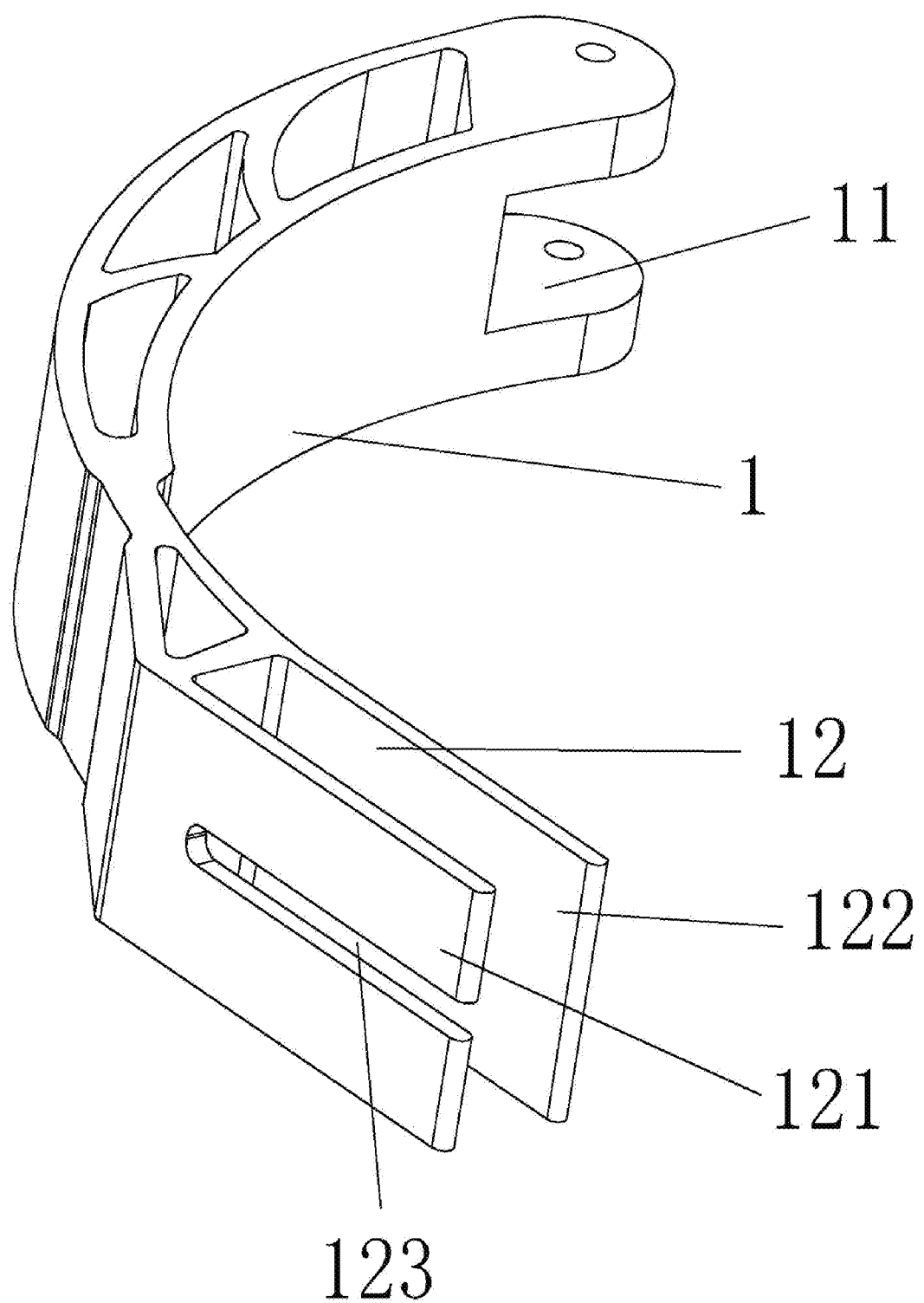
FIG. 2 is a perspective view of the rear brake assembly with the visual warning device removed.
Figure 3:
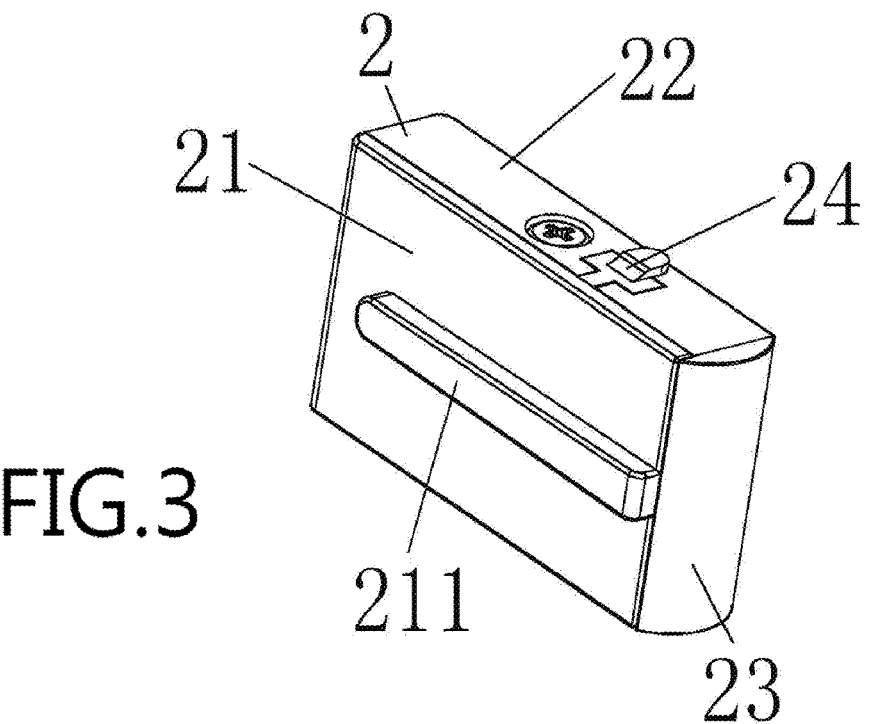
FIG. 3 is a perspective view of the visual warning device.
Figure 4:
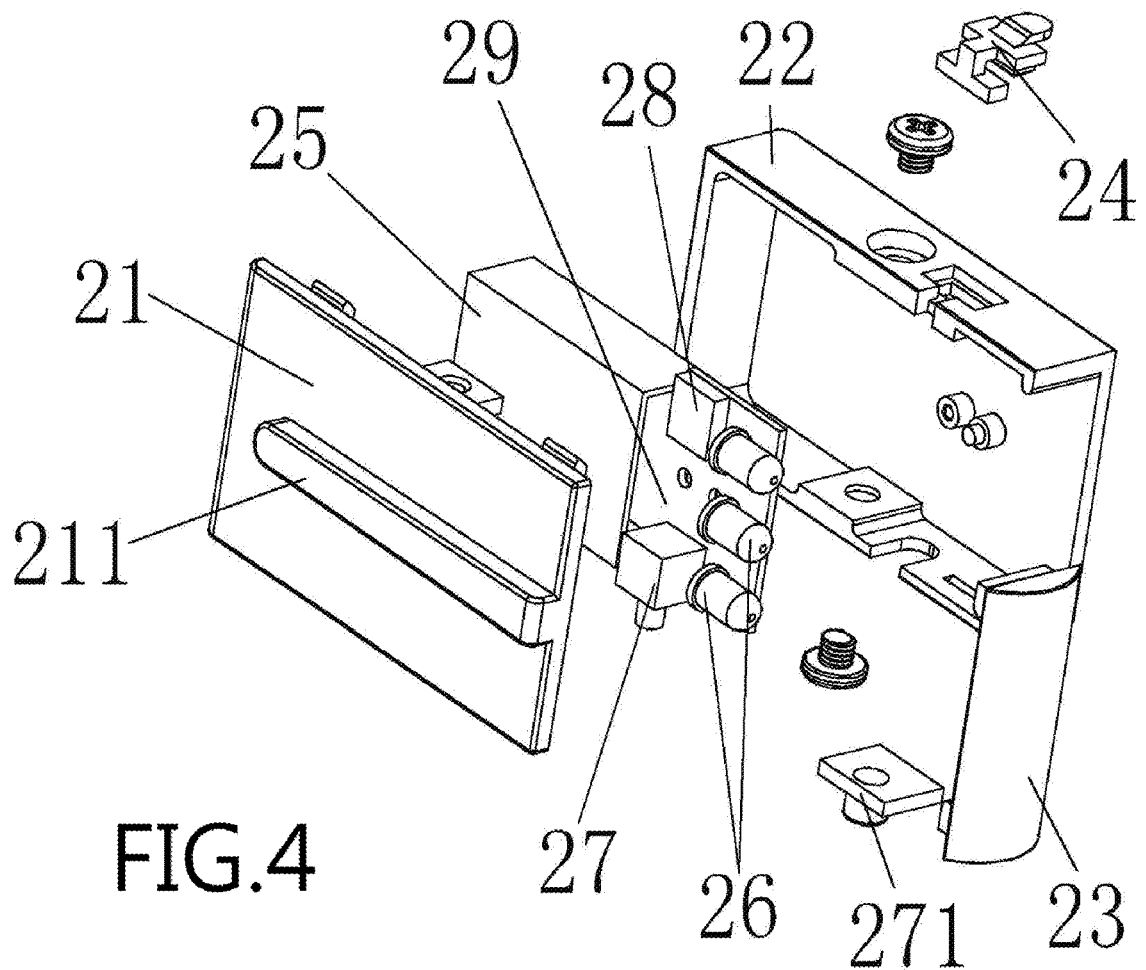
FIG. 4 is an exploded view of the visual warning device.

Referring to FIGS. 1 to 4, a rear brake assembly of a kick scooter of the invention comprises a brake 1 comprising a bifurcation 11 at one end and pivotably secured to a deck of the kick scooter, and a cavity 12 at the other end and having a rectangular section, the cavity 12 comprising a lower plate 122 and an upper plate 121 having a groove 123 to divide the upper plate 121 into two halves; and a translucent visual warning device 2 comprising a first shell 21 having an outer ridge 211 complimentarily disposed in the groove 123 for fastening the visual warning device 2 between the upper plate 121 and the lower plate 122, a second shell 22 secured to the first shell 21, a translucent cover 23 slidably secured to both the first shell 21 and the second shell 22, a plurality of electric lights 26, a switch 27 having a pushbutton 271 for turning on or off the switch 27, a circuit board 29, a rechargeable battery 25 electrically connected to the electric lights 26, the switch 27 and the circuit board 29 respectively, a USB port 28 electrically connected to the circuit board 29, and a cap 24 for sealing the USB port 28.

It is envisaged by the invention that it is easy to detach the visual warning device 2 by pulling the ridge 211 if it is malfunctioned. Further, it is easy to replace any malfunctioned components in the visual warning device 2 by opening the cover 23.

While the invention has been described in terms of preferred embodiments, those skilled in the art will recognize that the invention can be practiced with modifications within the spirit and scope of the appended claims.

What is claimed is:

1. A rear brake assembly of a kick scooter comprising:
    a brake comprising an upper plate at one end, a lower plate under the upper plate, and an attaching member having an open end wherein the attaching member is formed between the lower plate and the upper plate and has a section of U; and
    a visual warning device being a module and fastened in the attaching member by snapping.

2. The rear brake assembly of claim 1, wherein at least one of the upper plate and the lower plate has a groove, and the visual warning device comprises an outer ridge complimentarily disposed in the groove.

3. The rear brake assembly of claim 2, wherein the groove has a section of U and is tapered toward its bottom end.

4. The rear brake assembly of claim 1, wherein the visual warning device comprises a plurality of electric lights, a switch, a circuit board, and a battery electrically connected to the electric lights, the switch and the circuit board respectively; wherein the battery is rechargeable; wherein the visual warning device further comprises a USB port electrically connected to the circuit board which is further electrically connected to the battery; and wherein the visual warning device further comprises a cap for sealing the USB port, the switch has a pushbutton, and both the cap and the pushbutton are exposed.

5. The rear brake assembly of claim 1, wherein the visual warning device further comprises a first shell having the outer ridge complimentarily disposed in the groove, a second shell secured to the first shell, and a translucent cover slidably secured to both the first shell and the second shell.

* * * * *